US011052961B2

(12) United States Patent
Hendey

(10) Patent No.: US 11,052,961 B2
(45) Date of Patent: Jul. 6, 2021

(54) SELECTABLE MOTOR CLUTCH, SYSTEM, AND METHOD

(71) Applicant: Matthew Hendey, Indianapolis, IN (US)

(72) Inventor: Matthew Hendey, Indianapolis, IN (US)

( * ) Notice: Subject to any disclaimer, the term of this patent is extended or adjusted under 35 U.S.C. 154(b) by 0 days.

(21) Appl. No.: 16/427,917

(22) Filed: May 31, 2019

(65) Prior Publication Data

US 2020/0255082 A1 Aug. 13, 2020

Related U.S. Application Data

(63) Continuation of application No. 15/936,053, filed on Mar. 26, 2018, now Pat. No. 10,689,056, which is a
(Continued)

(51) Int. Cl.
| | |
|---|---|
| *B62K 11/02* | (2006.01) |
| *B62M 6/55* | (2010.01) |
| *B62M 6/40* | (2010.01) |
| *B62K 19/18* | (2006.01) |
| *B62J 1/08* | (2006.01) |
| *B62K 19/34* | (2006.01) |

(Continued)

(52) U.S. Cl.
CPC .............. *B62K 19/18* (2013.01); *B62J 1/08* (2013.01); *B62K 11/02* (2013.01); *B62K 19/32* (2013.01); *B62K 19/34* (2013.01); *B60K 1/04* (2013.01); *B60Y 2200/13* (2013.01); *B62M 6/40* (2013.01); *B62M 6/55* (2013.01); *B62M 6/90* (2013.01)

(58) Field of Classification Search
CPC ........ B62K 19/18; B62K 19/32; B62K 11/02; B62K 19/34; B62M 6/40; B62M 6/55; B62M 6/90; B62J 1/08; B60K 1/04; B60Y 2200/13
USPC ..................................................... 180/206.4
See application file for complete search history.

(56) References Cited

U.S. PATENT DOCUMENTS

| | | | |
|---|---|---|---|
| 6,230,586 B1 * | 5/2001 | Chang ...................... | B62M 6/55 180/206.4 |
| 7,938,242 B2 * | 5/2011 | Chen ...................... | F16D 41/30 192/64 |

(Continued)

*Primary Examiner* — Tony H Winner
*Assistant Examiner* — Felicia L. Brittman
(74) *Attorney, Agent, or Firm* — Roberts IP Law; John Roberts, Esq.

(57) ABSTRACT

A pawls-type one-way clutch selectably connects and disconnects an electric motor and drive system with the front sprocket of a bicycle. Laterally-extending pivotable pawls on a first rotatable member engage cam surfaces on a frictionally rotatable plate and cause the pawls to either engage with or disengage from corresponding teeth in a ratchet wheel attached to a second rotatable member. Sensors and a controller determine whether a rider is pedaling the bicycle and applying rotational power in the first rotational direction, and if so, the motor applies power in the forward rotational direction, causing the clutch to engage and power to be transmitted to the front sprocket. Otherwise, the motor applies power in the rearward rotational direction, causing the clutch to disengage the front sprocket from the electric motor, which allows the bicycle to be rolled backwards freely without attempting to back-drive the electric motor and drive system in reverse.

6 Claims, 16 Drawing Sheets

Related U.S. Application Data continuation-in-part of application No. 15/098,502, filed on Apr. 14, 2016, now Pat. No. 10,137,954.

(60) Provisional application No. 62/478,791, filed on Mar. 30, 2017, provisional application No. 62/147,356, filed on Apr. 14, 2015.

(51) Int. Cl.
*B62K 19/32* (2006.01)
*B60K 1/04* (2019.01)
*B62M 6/90* (2010.01)

(56) References Cited

U.S. PATENT DOCUMENTS

| | | | |
|---|---|---|---|
| 8,777,791 B1 * | 7/2014 | Hino | B60W 20/40 |
| | | | 475/5 |
| 2010/0051373 A1 * | 3/2010 | Lee | B62M 6/55 |
| | | | 180/206.4 |

* cited by examiner

SELECTABLE MOTOR CLUTCH, SYSTEM, AND METHOD

CROSS-REFERENCE TO RELATED APPLICATIONS

This application claims priority to and incorporates herein by reference, both U.S. patent application Ser. No. 15/936,053 to Hendey, filed Mar. 26, 2018 ("the '053 application"), and the provisional patent application to which the '053 application claims priority, namely U.S. Pat. App. Ser. No. 62/478,791 to Hendey et al., filed Mar. 30, 2017 ("the '791 application"). This application also claims priority to, is a continuation-in-part of, and incorporates herein by reference, both U.S. patent application Ser. No. 15/098,502 to Hendey et al., filed Apr. 14, 2016 and published on Oct. 20, 2016 as US 2016/0303961 A1 ("the '502 application"), and the provisional patent application to which the '502 application claims priority, U.S. Pat. App. Ser. No. 62/147,356 to Hendey et al., filed Apr. 14, 2015.

FEDERALLY SPONSORED RESEARCH OR DEVELOPMENT

None.

TECHNICAL FIELD

The present invention relates generally to drive systems for electric bicycles and the like.

BACKGROUND

When a typical non-electric bicycle is moved in the rearward direction such that the wheels rotate in the opposite direction as compared to when the bicycle is moving in the forward direction, the sprocket on the rear wheel, and thus the chain, the front sprocket, the crankshaft and the pedals, all likewise rotate in the opposite direction as compared to when the bicycle is moving in the forward direction (i.e., the pedals move backwards when the bicycle rolls backwards). However, in an electric bicycle such as the one disclosed in the '502 application, moving the bicycle in the rearward direction may attempt to force the motor and electrically-powered drive system to rotate in reverse, which in various example embodiments might be difficult or impossible to do in this manner, i.e., by applying reverse rotation to the front sprocket (for instance due to gear ratios or design of the drive system or motor). Accordingly, a need exists for a way to allow such an electric bicycle to roll backwards freely. It would also be desirable in certain embodiments to cause the pedals to move backwards when the bicycle rolls backwards freely, to track the function expected of a typical non-electric bicycle.

SUMMARY

The present invention(s) elegantly overcome many of the drawbacks of prior systems and provide numerous additional improvements and benefits as will be apparent to persons of skill in the art. In various example embodiments a pawls-type one-way clutch selectably connects and disconnects an electric motor and drive system with the front sprocket of a bicycle. Laterally-extending pivotable pawls on a first rotatable member engage cam surfaces on a frictionally rotatable plate or "mute ring" and cause the pawls to either engage with or disengage from corresponding teeth in a ratchet wheel attached to a second rotatable member. Sensors and a controller determine whether a rider is pedaling the bicycle and applying rotational power in the first rotational direction, and if so, the motor applies power in the forward rotational direction, causing the clutch to engage and power to be transmitted from the electric motor and drive system to the front sprocket. Otherwise, the electric motor applies power in the rearward rotational direction, causing the clutch to disengage the front sprocket from the electric motor, which allows the bicycle to be rolled backwards freely without attempting to drive the electric motor and drive system in reverse. In various example embodiments, even when the clutch has disengaged the front sprocket from the electric motor, the front sprocket, crank arms, and pedals move in the reverse rotational direction proportionally with the rear wheel when the bicycle is rolled backwards, tracking the function expected of a typical non-electric bicycle.

For example, provided in various example embodiments is a selectably disconnectable one-way clutch system for a drive system of a bicycle having a front sprocket configured to receive combined rotational power, in a first rotational direction about an axis, and in parallel from both a rider pedaling the bicycle and from an electric motor with a drive system. The system may comprise: a first member rotatable about the axis and configured to receive first rotational power in the first rotational direction from either the electric motor and the drive system, or the rider pedaling the bicycle, or both; a second member rotatable about the axis and configured to transmit the first rotational power in the first rotational direction to at least one component connected with the front sprocket; and a selectably disconnectable one-way clutch configured to rotationally connect and disconnect the first and second members. The selectably disconnectable one-way clutch may comprise a plurality of pawls pivotably mounted to the first (or second) rotatable member and biased to engage, in the first rotational direction but not in a second rotational direction that is opposite the first rotational direction, teeth of a ratchet wheel connected to the second (or first, respectively) rotatable member. The pawls may each include an extension portion that extends laterally beyond the teeth. A ring member or "mute ring" may be provided adjacent to the pawls that is frictionally rotatable about the axis through a predetermined limited rotational angle relative to the second rotatable member. The ring member may comprise cam surfaces configured to guide or otherwise engage the extension portions of the pawls such that: rotational movement of the ring member in the first rotational direction relative to the pawls allows the pawls to pivot toward and engage the teeth of the ratchet and to thereby rotationally connect the first and second members; and rotational movement of the ring member in the second rotational direction relative to the pawls causes the pawls to pivot away from the teeth of the ratchet and to thereby rotationally disconnect the first and second members. The selectably disconnectable one-way clutch may be configured to urge relative rotational movement of the ring member in the first rotational direction relative to the pawls when the electric motor and the drive system apply rotational power in the first rotational direction. The selectably disconnectable one-way clutch may also be configured to urge relative rotational movement of the ring member in the second rotational direction relative to the pawls when the electric motor and the drive system apply rotational power in the second rotational direction. In various example embodiments the first and second members may be reversed, such that the pawls are attached to the first rotatable member and the ratchet wheel is attached to second rotatable member, respectively.

Also provided in various example embodiments is a bicycle capable of being propelled at least in part by a rider pedaling the bicycle, the bicycle comprising: a frame; an electric motor with a drive system and motor controller; the drive system comprising a front sprocket configured to receive combined rotational power, in a first rotational direction about an axis, and in parallel from both the rider pedaling the bicycle and from the electric motor with the drive system; the selectably disconnectable one-way clutch system as described herein; and a sensor configured to sense whether or not the rider is pedaling the bicycle and applying rotational power in the first rotational direction, and further configured to send a corresponding signal to the motor controller. The motor controller may be configured to cause the electric motor and the drive system to apply rotational power in the first rotational direction when the signal indicates at least that the rider is pedaling the bicycle and applying rotational power in the first rotational direction. The motor controller may also be configured to cause the electric motor and the drive system to apply rotational power in the second rotational direction when the signal indicates at least that the rider is not pedaling the bicycle and not applying rotational power in the first rotational direction. In either case, the absence of a signal may constitute a signal for purposes of any algorithm.

In various example embodiments a bicycle may further comprise a rear wheel rotationally connected to the frame, the rear wheel comprising a rear hub and a rear sprocket connected to the rear hub with a first one-way locking mechanism that allows the rear sprocket to rotate in the second direction when the rear wheel rotates in the first direction and forces the rear sprocket to rotate in second direction when rear wheel rotates in the second direction (e.g., a conventional "freewheel" rear hub). A bicycle may further comprise a power transmission member, such as a chain, belt, shaft, or the like, connecting the front sprocket and the rear sprocket so that they rotate together proportionally in the same rotational direction. A bicycle may further comprise left and right crank arms connected at first ends thereof with a shaft rotatable about the axis and connected with the front sprocket by a second one-way locking mechanism that allows the shaft to rotate in the second direction when the front sprocket rotates in the first direction and forces the shaft to rotate in second direction when sprocket rotates in the second direction (e.g., the "freewheel" ratcheting mechanism disclosed with respect to FIGS. 11 and 12 in the '502 application). A bicycle may further comprise left and right pedals (not shown) connected with the left and right crank arms at second ends thereof, as is well known and would be clearly understood in the art of bicycles. A bicycle may further comprise the present selectably disconnectable one-way clutch system configured so that the rear wheel and rear sprocket are able to rotate in the second direction and cause the front sprocket, left and right crank arms, and left and right pedals, to proportionally rotate in the second direction about the axis, without causing rotation of the electric motor, when the signal indicates at least that the rider is not pedaling the bicycle nor applying rotational power in the first rotational direction.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection. For example, while the Background section of this application describes the '502 application, the present invention has broad applicability to many other designs as will be apparent to persons of skill in the art, and the claims of any patent that issue from this application should not be limited in any way by the disclosure of the '502 application.

DETAILED DESCRIPTION OF EXAMPLE EMBODIMENTS

Figure 1:
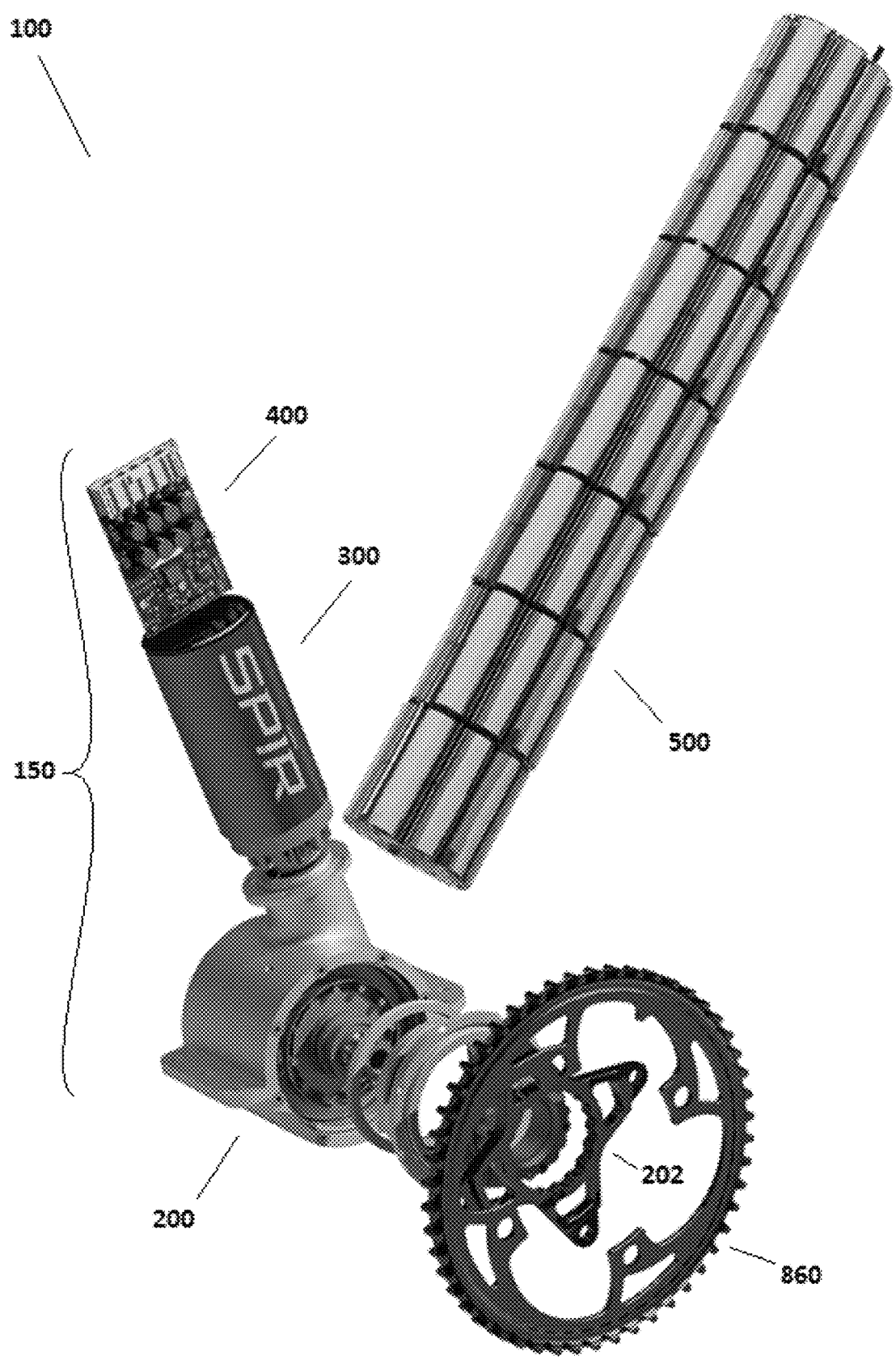
FIG. 1 is a perspective illustration of example components of an integrated electric bicycle drive system according to various example embodiments.
Figure 2:
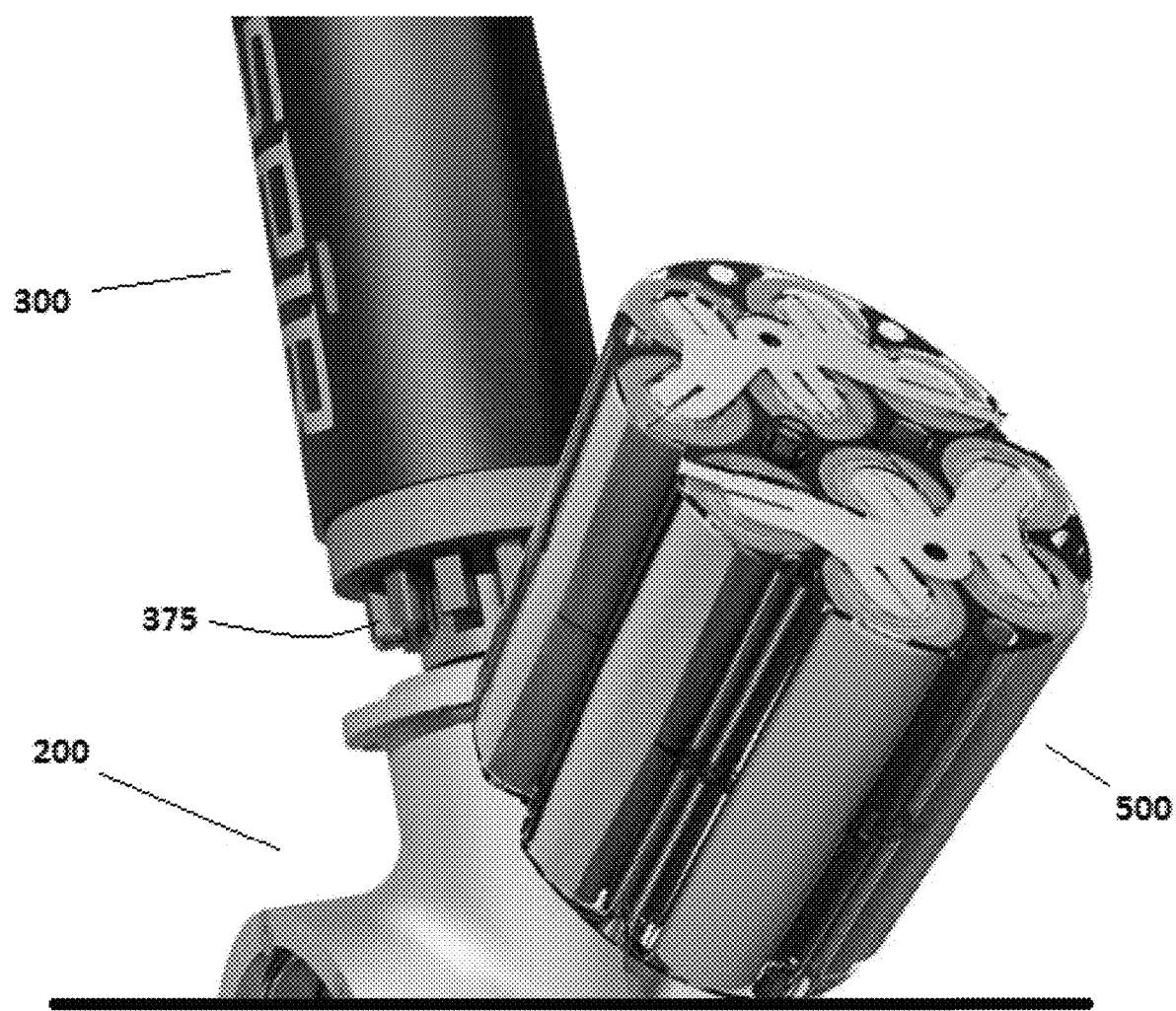
FIG. 2 is a closer view of the example components of FIG. 1, showing an example longitudinally-extending battery pack partially cut-away.
Figure 3:
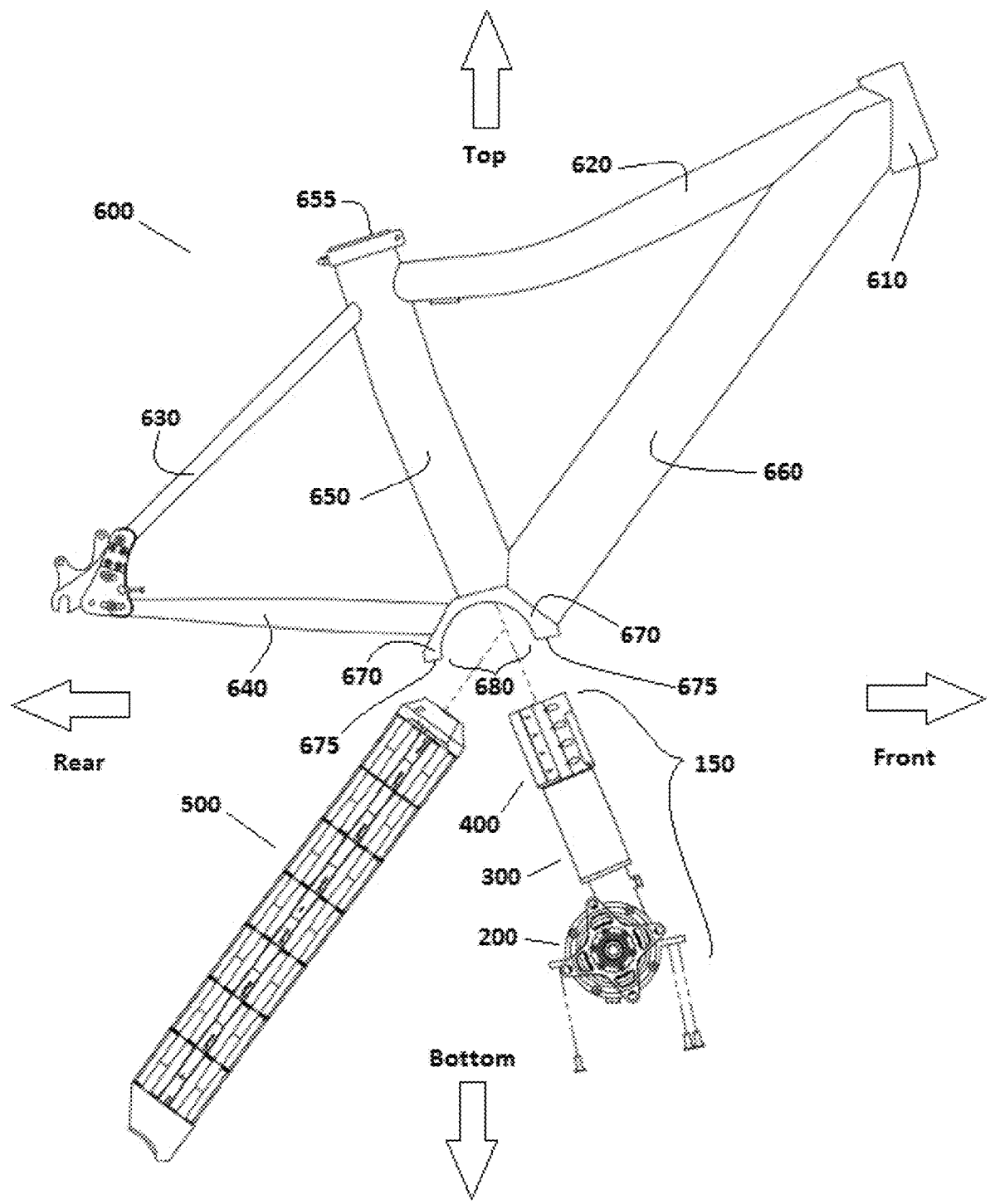
FIG. 3 is an exploded right side elevation view of example components of an integrated electric bicycle drive system, illustrating the removal or replacement of an example integrated unitary motor-controller-drive system and an example longitudinally-extending battery pack through an open bottom portion of a bottom bracket shell of an example bicycle frame according to various example embodiments.
Figure 4:
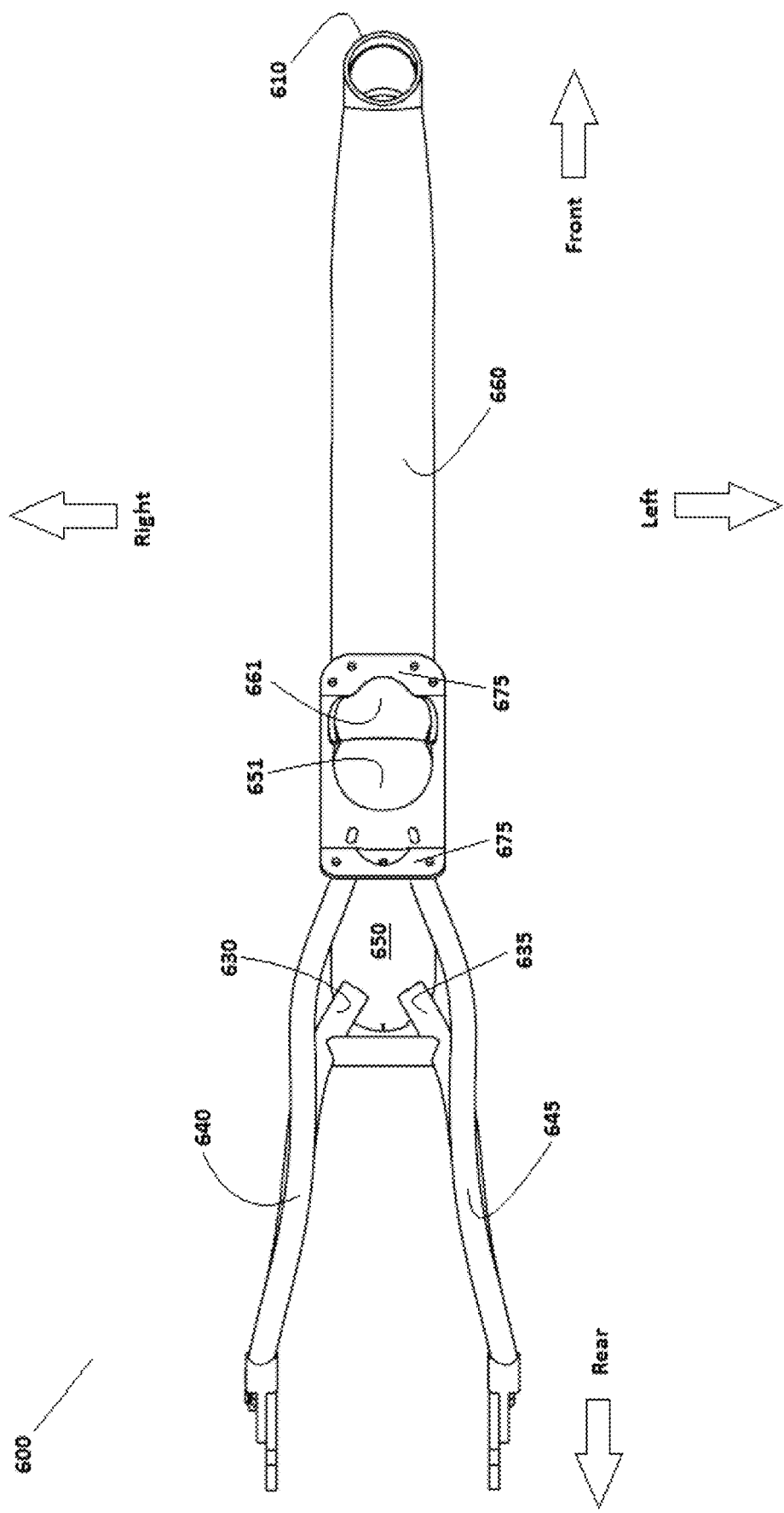
FIG. 4 is a bottom plan view of the example bicycle frame of FIG. 3, showing the open bottom portion of the bottom bracket shell according to various example embodiments.
Figure 5:
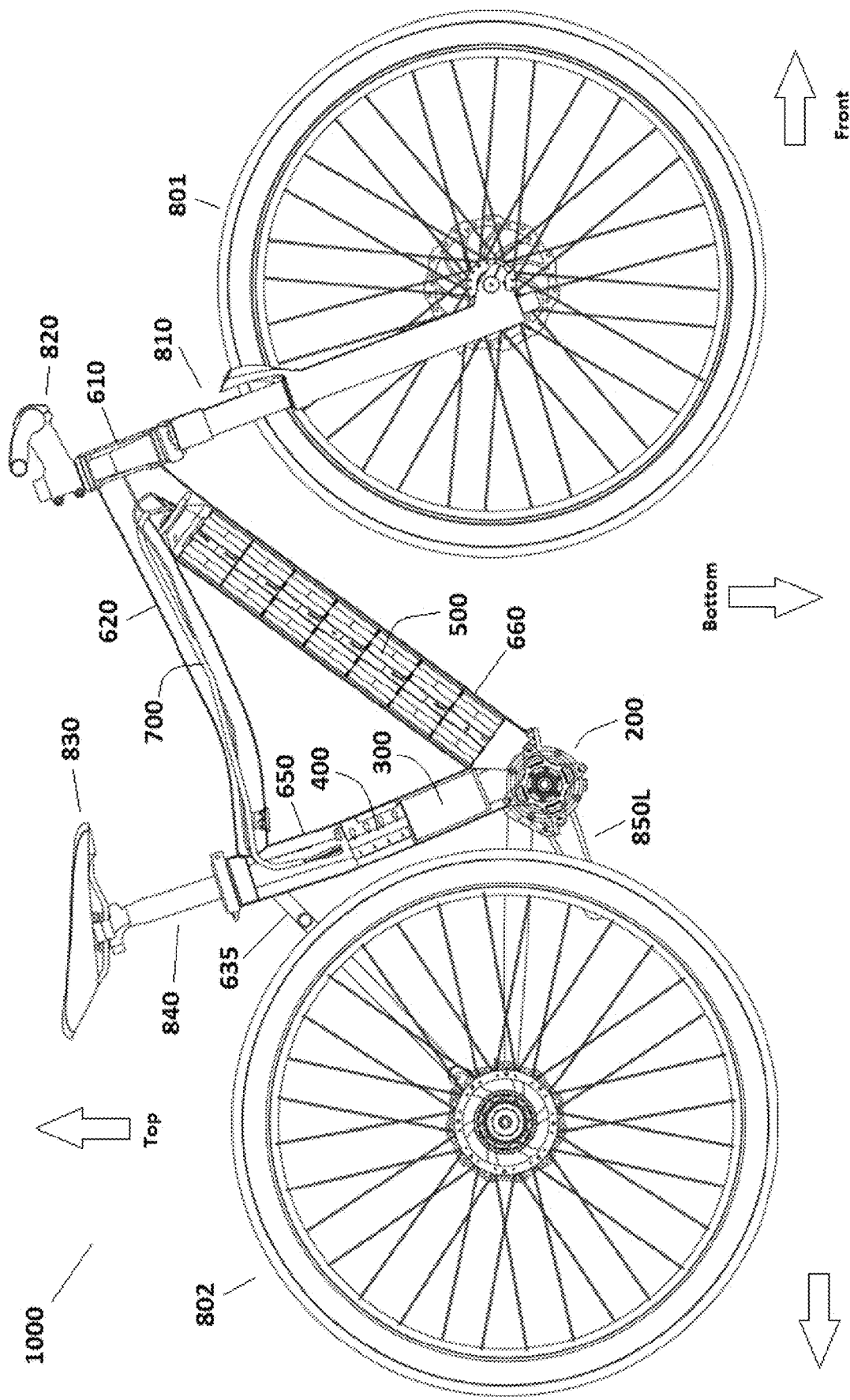
FIG. 5 is a right side elevation view of an example bicycle having an electric bicycle drive system integrated into the frame according to various example embodiments, with portions of the frame cut-away to illustrate various example components located within the frame.

Reference will now be made in detail to some specific example embodiments, including any best mode contemplated by the inventor. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments may be implemented without some or all of these features or specific details. In other instances, components and procedures well known to persons of skill in the art have not been described in detail in order not to obscure inventive aspects.

Various techniques and mechanisms will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the example techniques and mechanisms described herein will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

While various example embodiments of the present invention may be applicable to many different types of drive systems in many different types of electric bicycles, to illustrate one example embodiment a specific application will be described. For the avoidance of doubt, it is understood for purposes of this application that a bicycle has at least one front wheel that is steerable by a rider, at least one rear wheel that is driven, by a chain or otherwise, and that the forward direction is the normal direction a rider would ride the bicycle, and the forward direction of the wheels and pedals and components connected therewith is the rotational direction through which the wheels and pedals and components connected therewith would normally move when a rider is riding and pedaling the bicycle in the forward direction. Likewise, it is understood for purposes of this application that the rearward or backward direction is direction opposite the normal direction a rider would ride the bicycle, and the rearward or backward direction of the wheels and pedals and components connected therewith is the rotational direction opposite the rotational direction through which the wheels and pedals and components connected therewith would normally move when a rider is riding and pedaling the bicycle in the forward direction.

With reference to the '502 application that is incorporated herein by reference, in various example embodiments an electrically-powered drive system 200 may comprise two concentric "spindles" that may operate in parallel to power the bicycle 1000. The inner spindle 245 may function in combination with crankshafts 850L and 850R as a traditional bicycle crankshaft, attached to the pedals (not shown) on either side of the bicycle 1000. The outer spider 202 or "outer spindle" functions as the "e-assist," or the means by which the electric motor 300 and electrically-powered drive system 200 assists in driving the sprocket 860, transmission means 870, and rear wheel 802. The outer spider 202 or "outer spindle" may be connected to the rear wheel 802 through a ring gear 860 and a chain, belt, shaft, or other transmission means, 870.

Figure 6:
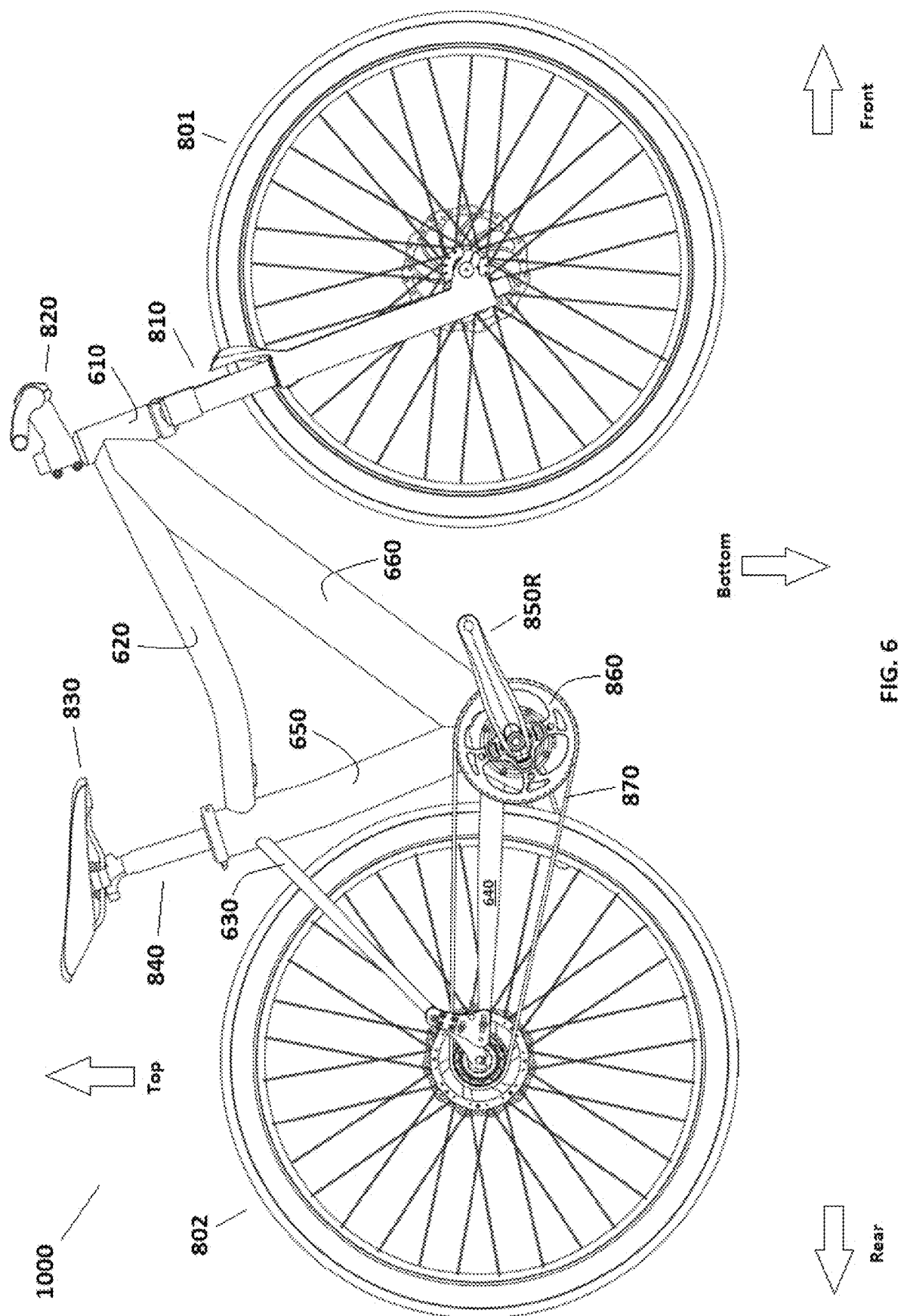
FIG. 6 is a right side elevation view of the example bicycle of FIG. 5, shown complete with the frame intact (except pedals not shown).
Figure 7:
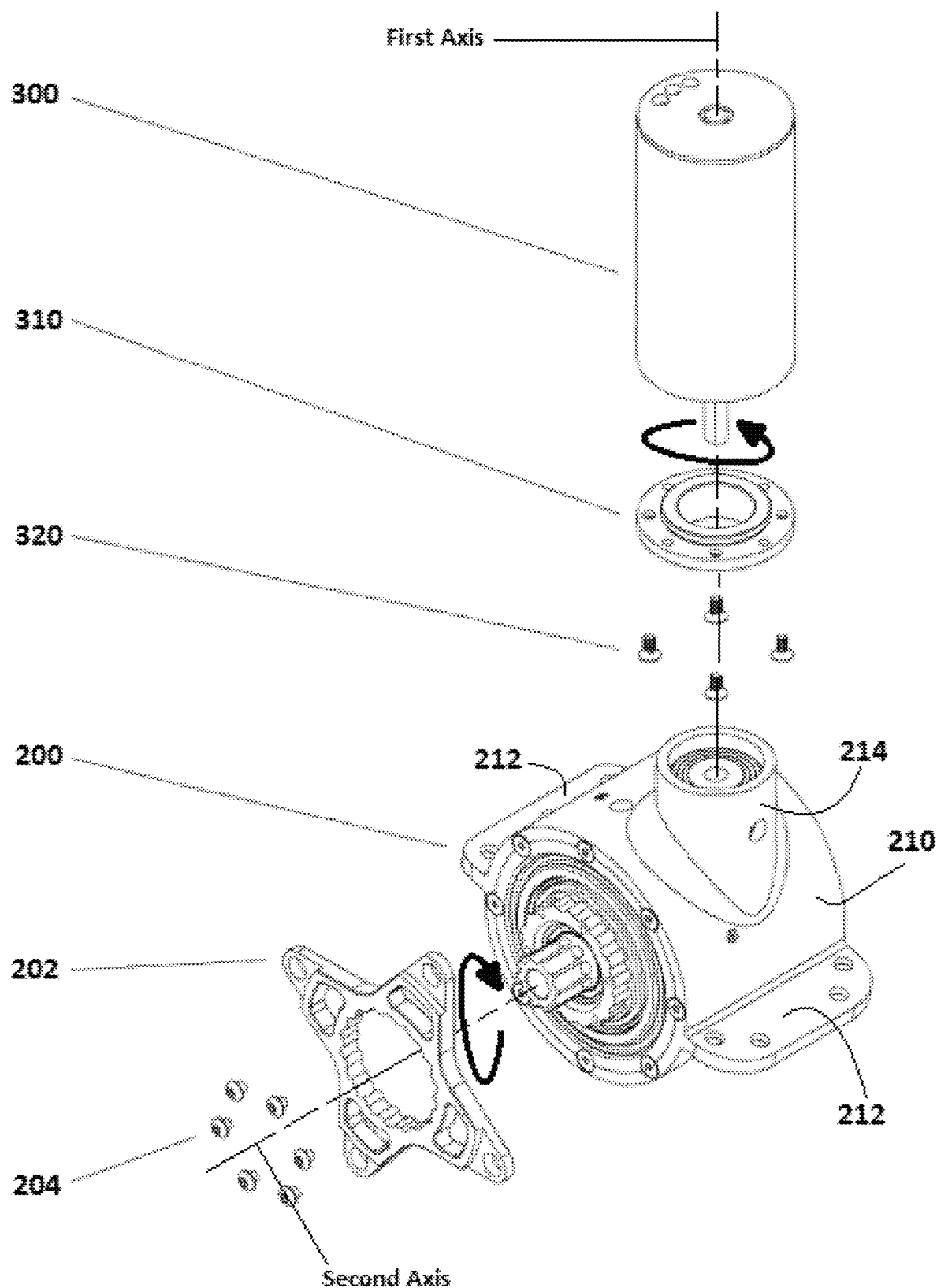
FIGS. 7, 8, and 9 are partially exploded perspective views of example components of an integrated unitary motor-controller-drive system according to various example embodiments.
Figure 8:
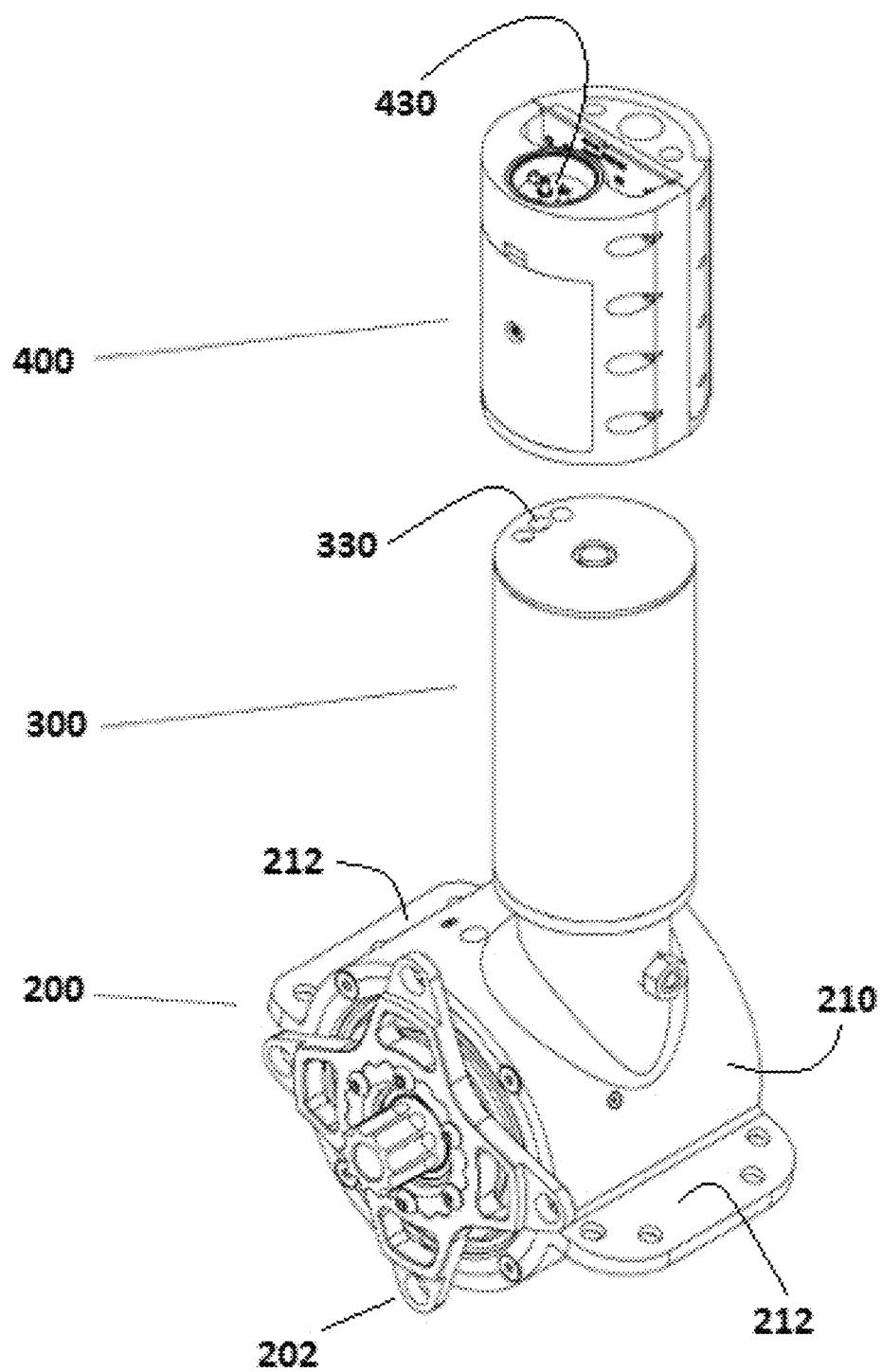
Figure 9:
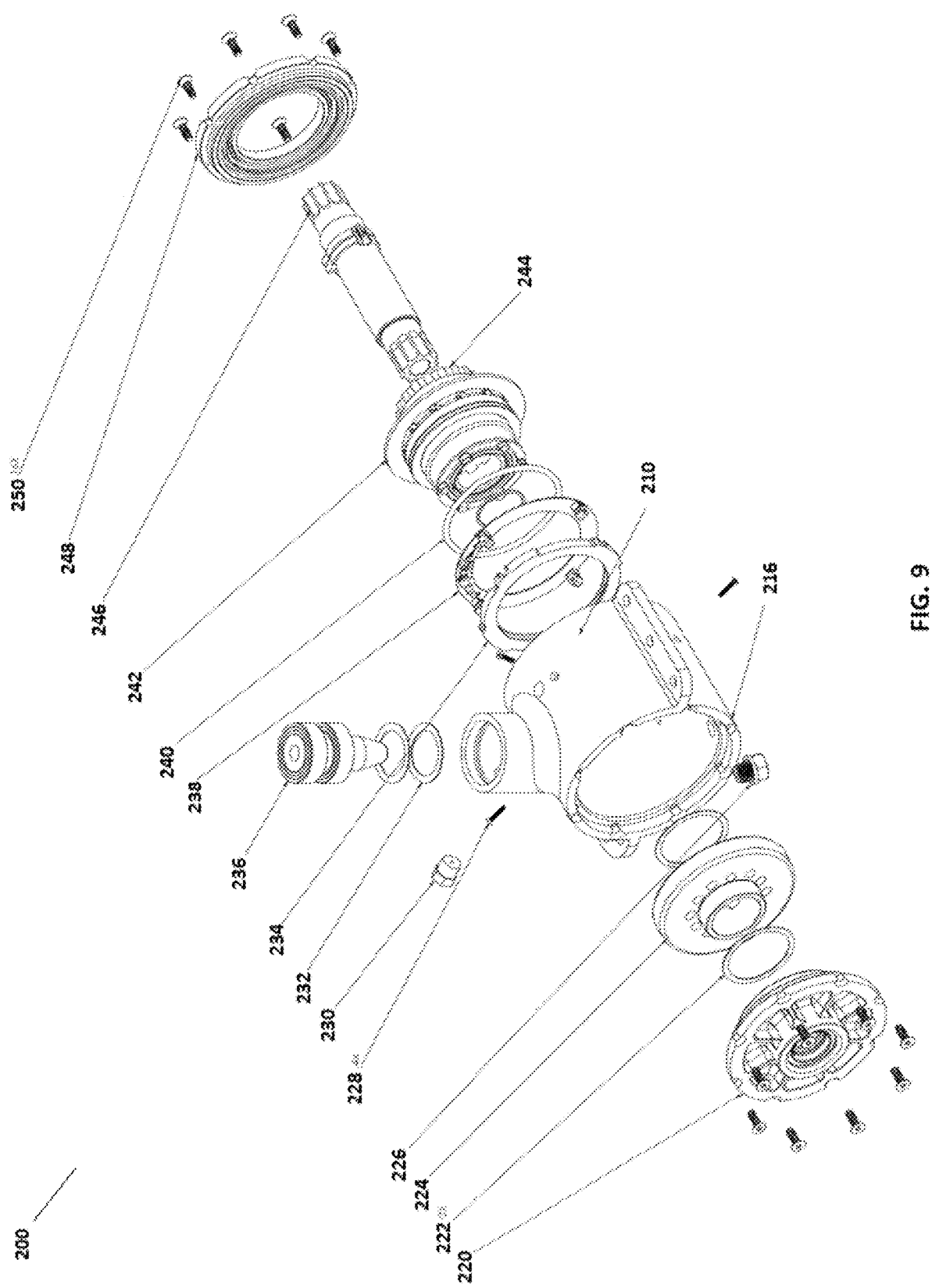
Figure 10:
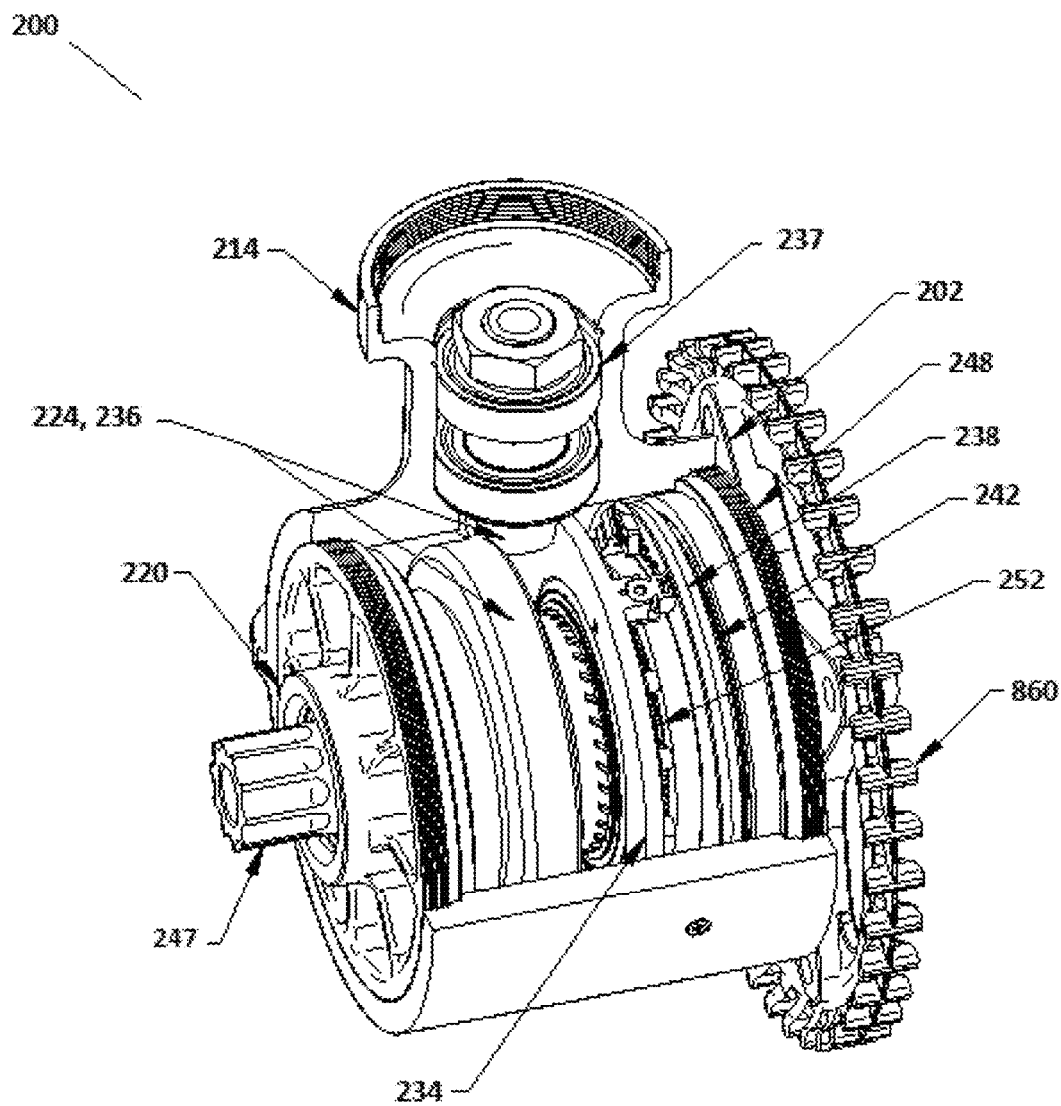
FIG. 10 is a perspective view of an example drive system according to various example embodiments, partially cut-away to illustrate various example components therein.
Figure 11:
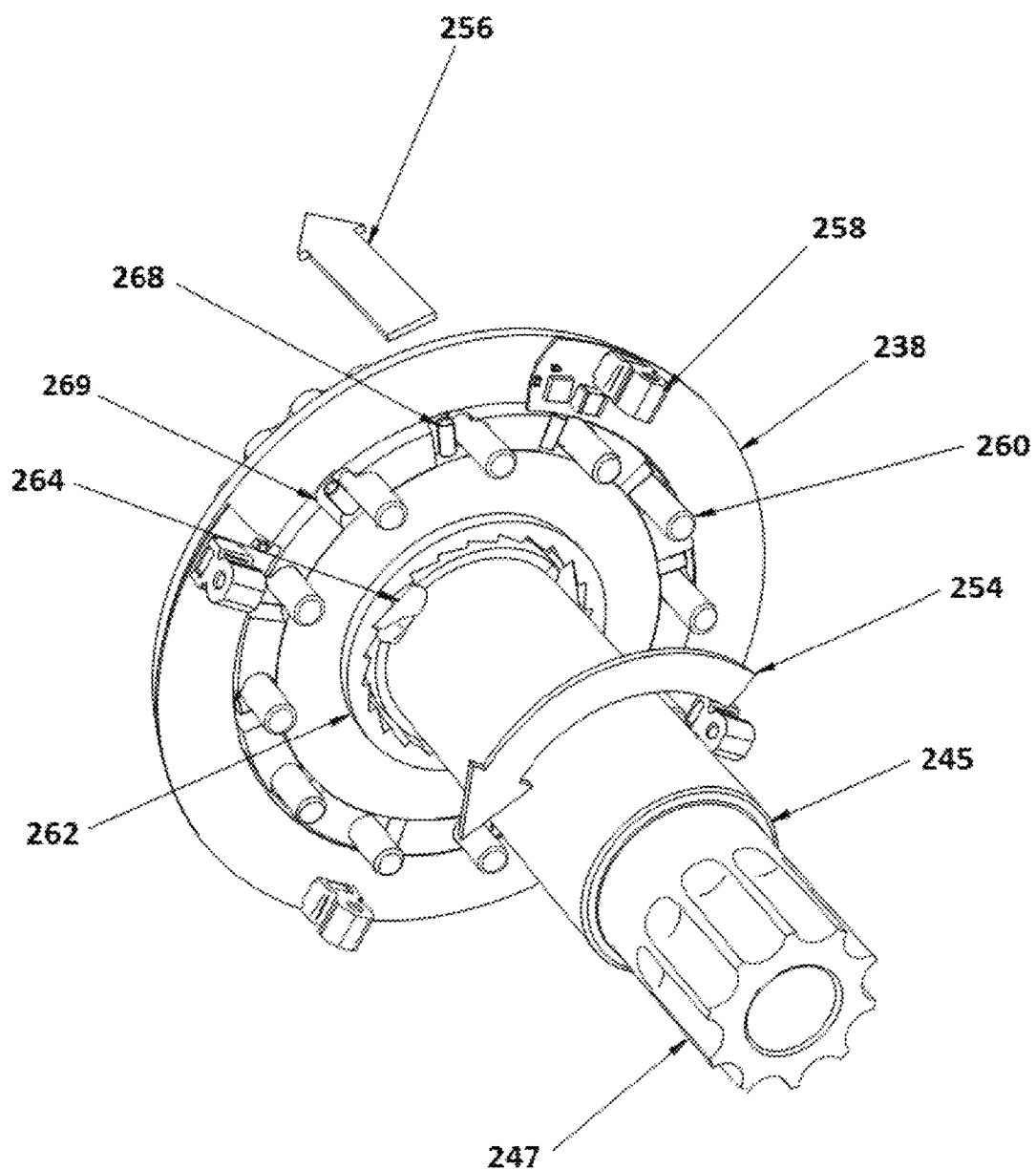
FIG. 11 is a perspective view of example components of an example torque sensing system for use in an integrated unitary motor-controller-drive system according to various example embodiments.
Figure 12:
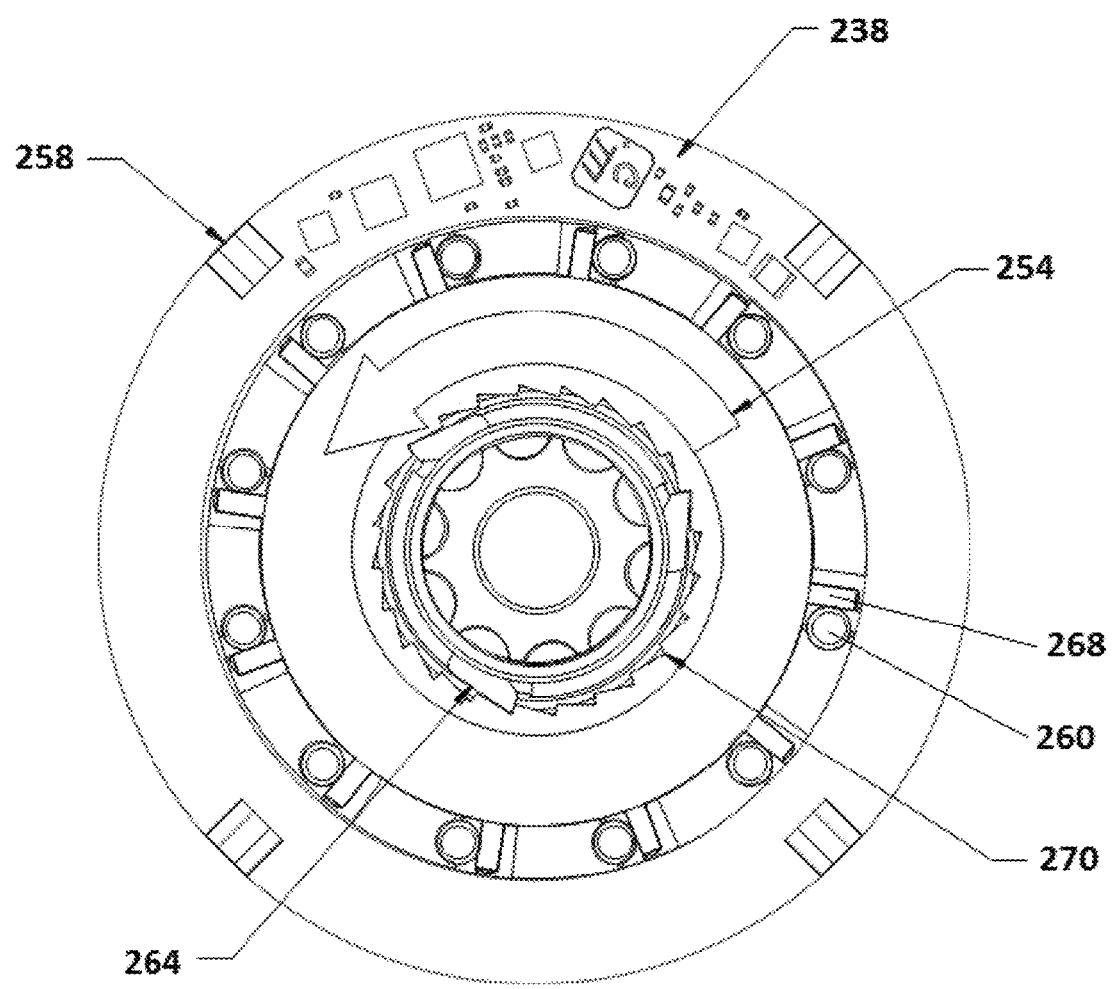
FIG. 12 is a left side elevation view of the example components of the example torque sensing system of FIG. 11.
Figure 13A:
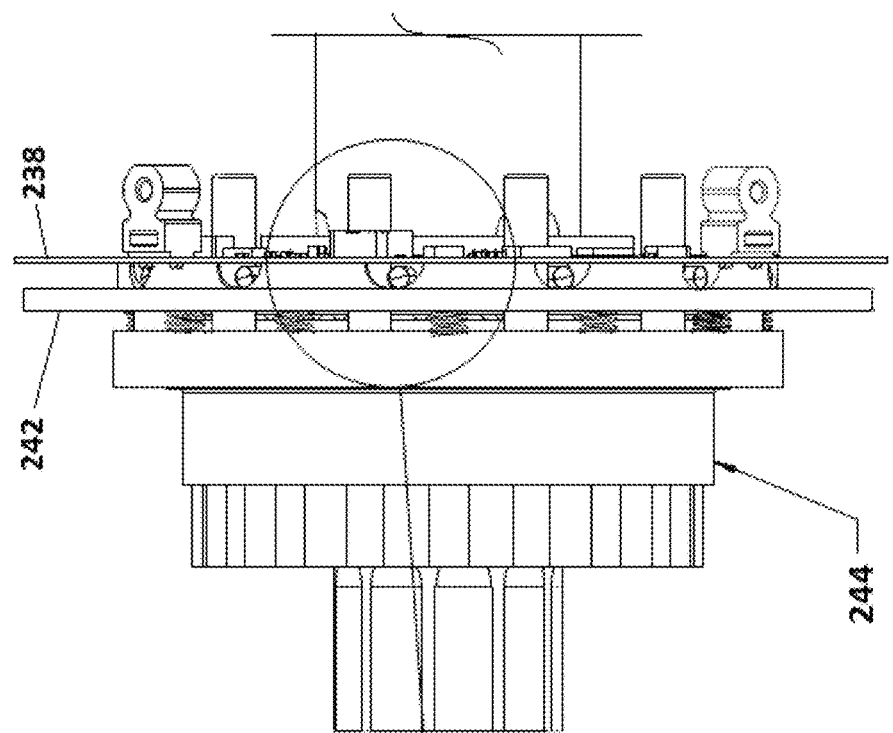
FIG. 13A is a front side elevation view of the example components of the example torque sensing system of FIG. 11, shown in a low or zero torque condition.
Figure 13B:
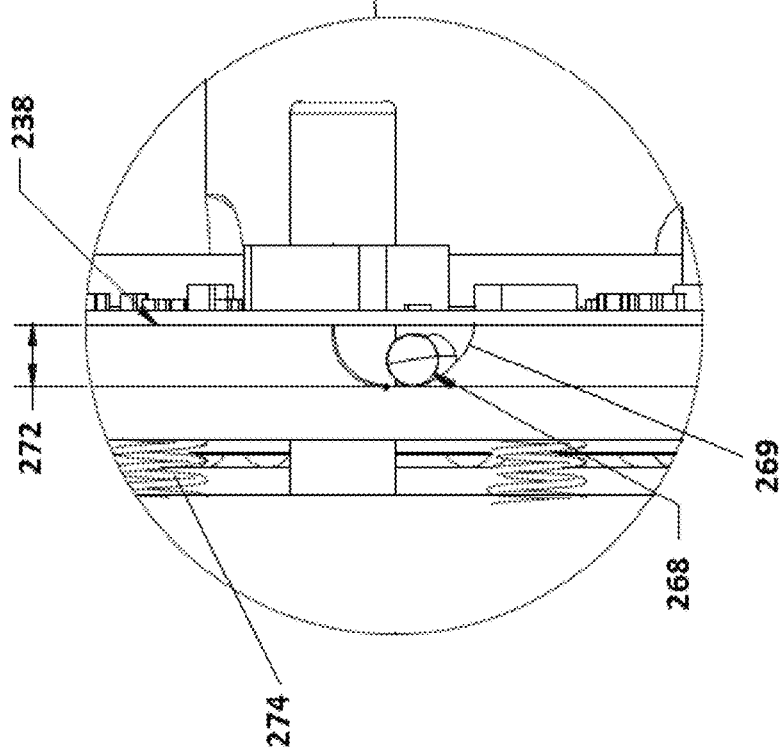
FIG. 13B is closer view of a portion of FIG. 13A.
Figure 14A:
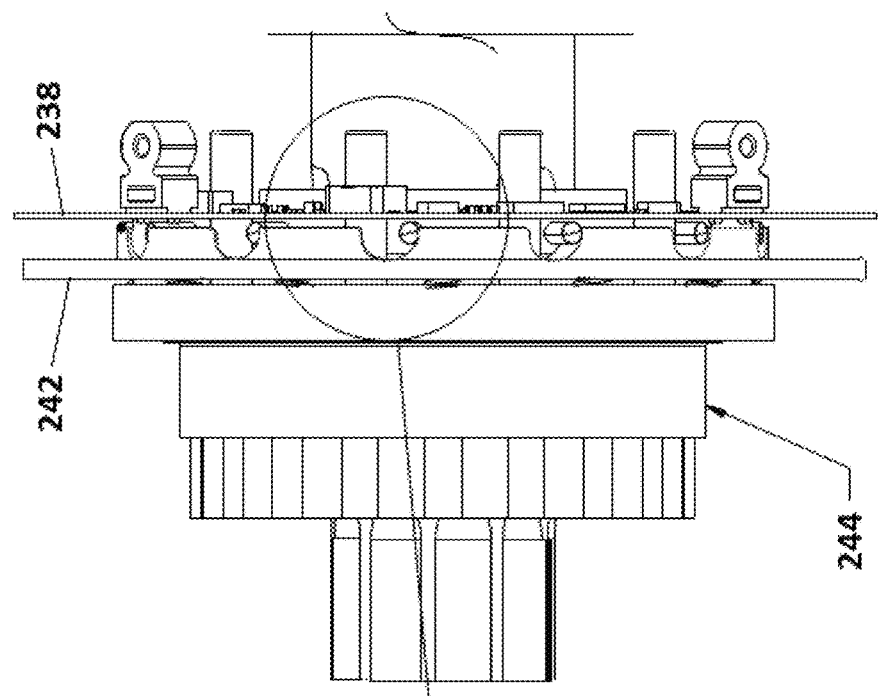
FIG. 14A is a front side elevation view of the example components of the example torque sensing system of FIG. 11, shown in a high torque condition.
Figure 14B:
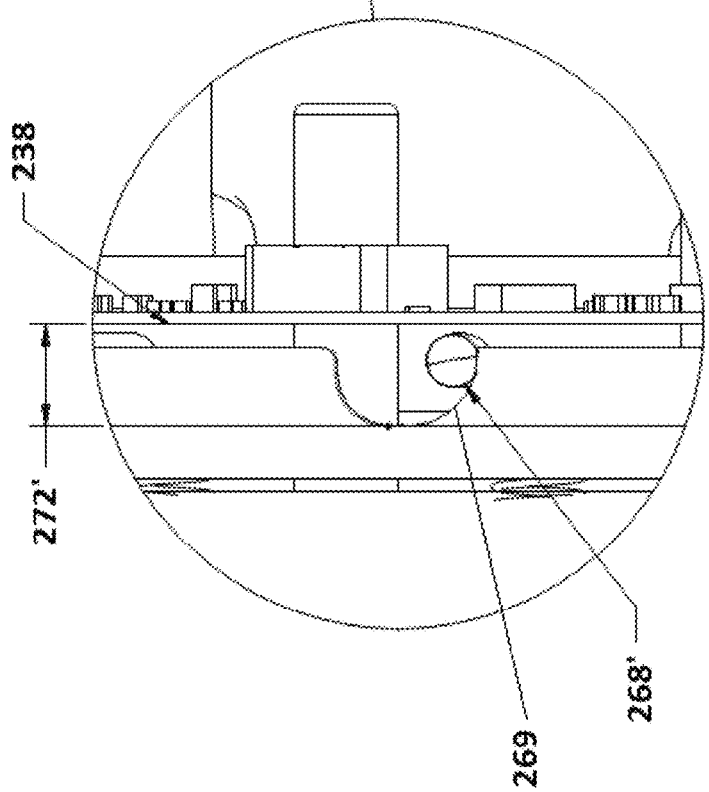
FIG. 14B is closer view of a portion of FIG. 14A.
Figure 15A:
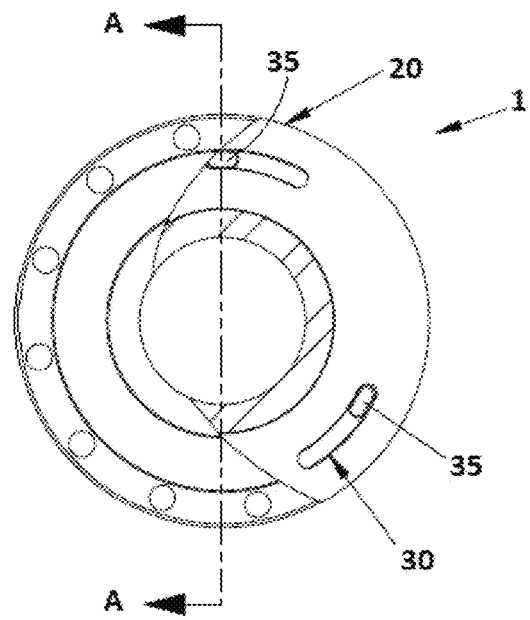
FIG. 15A is a front elevation view, partially cut away, of an example selectable motor clutch and system according to various example embodiments.
Figure 15B:
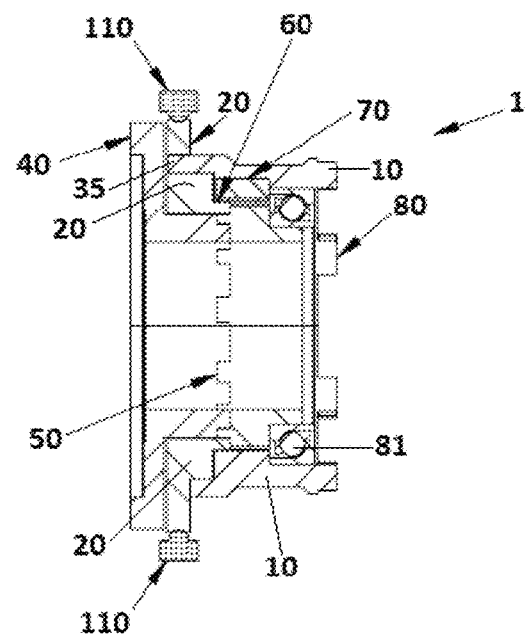
FIG. 15B is a right side elevation section view of the example selectable motor clutch and system of FIG. 15A, taken along line A-A.
Figure 15C:
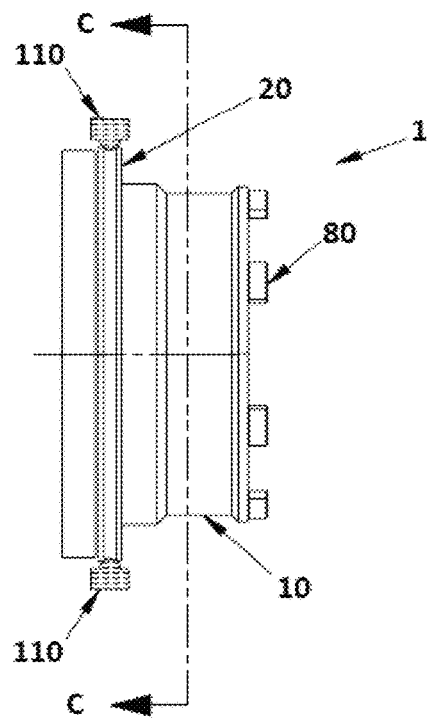
FIG. 15C is a right side elevation view of the example selectable motor clutch and system of FIG. 15A.
Figure 15D:
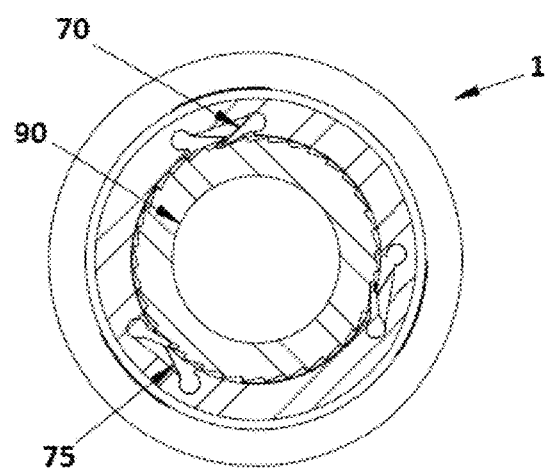
FIG. 15D is a rear elevation section view of the example selectable motor clutch and system of FIG. 15C, taken along line C-C.
Figure 16:
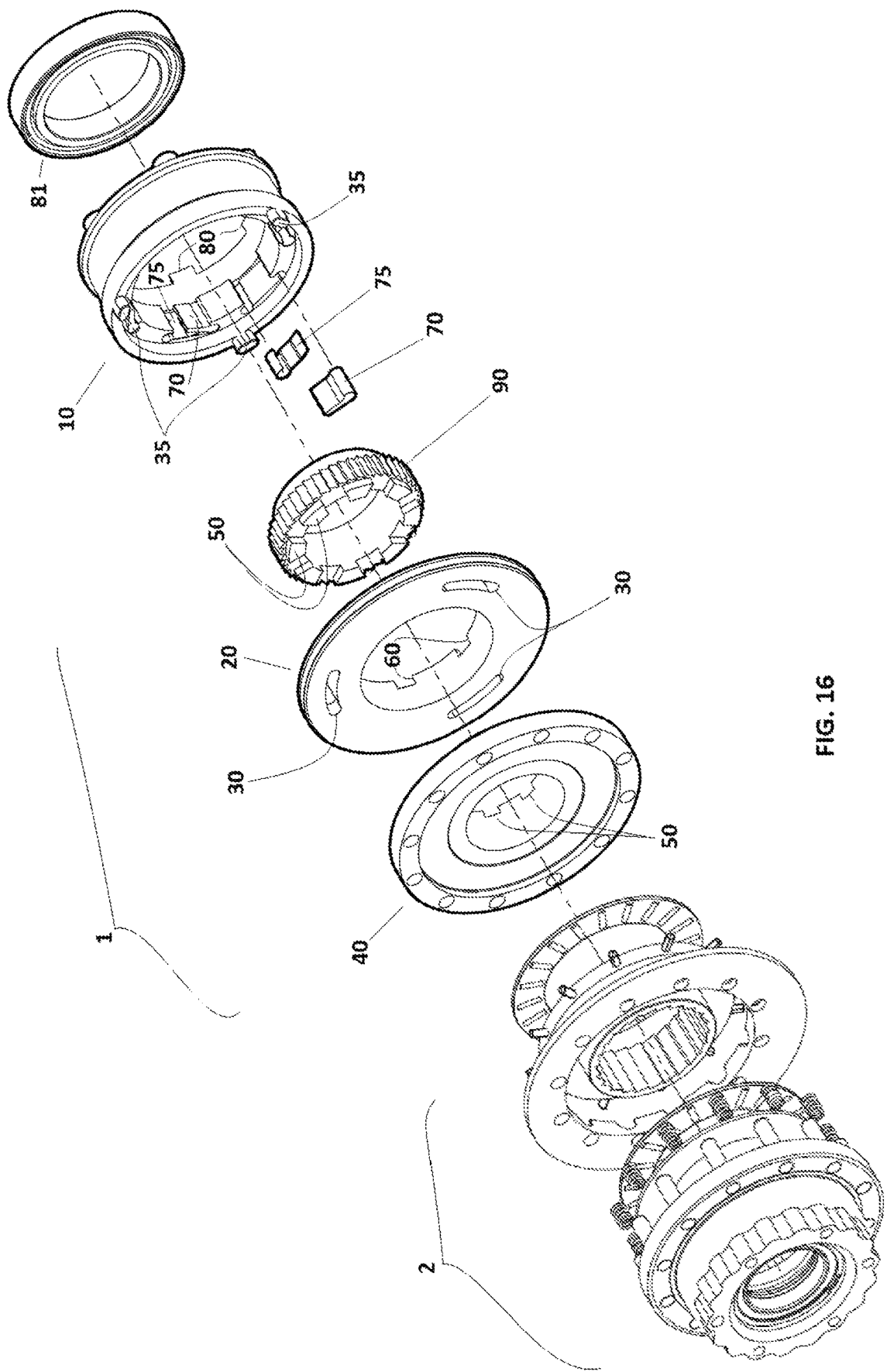
FIG. 16 is an exploded perspective view of the example selectable motor clutch and system of FIGS. 15A through 15D and 16.

With continuing reference to the '502 application, the rear wheel 802 may have a freewheel feature to allow the rear wheel 802 to roll forward without rotating the crankshafts 850L and 850R, but such a freewheel structure is not needed in the rear wheel 802 in the '502 application because a freewheel or one-way ratcheting feature is provided in the electrically-powered drive system 200. Specifically, the inner spindle 245 and outer spindle or spider 202 may be coupled together with a freewheel one-way ratchet clutch, for instance one including pivoting clutch pawls 264, mounting posts 258, guide pins 260, and ramp pins 268, configured to work in conjunction with a torque sensing board 238, all as described in the '502 application (FIGS. 11, 12). The rider (not shown) is able to freewheel by pedaling in the backward rotational direction by the action of pivoting clutch pawls 264 biased toward and locking with a torque collar 262 of the ratcheting clutch 270 in the forward direction 254 but not in the opposite direction. Thus, the outer spindle or spider 202 (FIGS. 7, 8) can rotate proportionally to the movement of the rear wheel 802 (FIG. 6), while the inner spindle 245 can optionally rotate more slowly, remain stationary, or even rotate backwards, allowing the rider to coast in the forward direction without needing to pedal. This also allows the electric motor 300 to propel the bicycle 1000 via the outer spindle or spider 202, independent of and in parallel with rider pedaling effort, as described in the '502 application.

Turning to present FIGS. 15A through 15D and 16 (and as shown and described in the '791 application), and with continuing reference to the '502 application, a novel selectable motor clutch system 1 is provided to allow an electric bicycle (such as, but not limited to, an electric bicycle 1000 like the one shown and described in the '502 application) to roll backwards freely without attempting to rotate the electrically-powered drive system 200 and electric motor 300 in reverse. To the extent the bicycle 1000 is using a rear wheel 802 with a typical hub that includes a sprocket that must rotate in reverse when the wheel rotates in reverse (for instance as described in the Background section of U.S. Pat. No. 7,938,242 B2 to Chen ("Chen"), the entirety of which is incorporated herein by reference), then the selectable motor clutch system 1 may allow the pedals to also move backwards when the bicycle rolls backwards, like a typical non-electric bicycle, all without attempting to back-drive or otherwise force the electrically-powered drive system 200 and electric motor 300 to rotate in reverse.

Present FIGS. 15A through 15D and 16 illustrate an example embodiment of a one-way pawls-style clutch 1 that is specially adapted to automatically decouple outer spindle or spider 202 from the electrically-powered drive system 200 and electric motor 300 when electric assist is not required to power the bicycle 1000. This may be accomplished by automatically sensing when electric assist is not required, for instance, by sensing that no forward rotational torque is being applied to the inner spindle 245 as described in paragraph [0042] of the '502 application. In response to sensing that electric assist is not required, and in conjunction with any other desirable algorithm, the controller 400 may automatically spin the electric assist motor 300 backwards slightly and/or momentarily to disengage the specially-designed one-way clutch 1 that transmits power from the electrical motor 300 to the outer spindle or spider 202, which may be connected to a front sprocket 860 (via, for instance, additional drive components 2 as depicted in dashed lines in FIG. 16 and as further described in '502 application).

In order to disengage the electrical motor 300 from the outer spindle or spider 202 when the motor 300 is spun backwards, a specially-designed pawls style one-way clutch 1 may be used in the electrically-powered drive system 200 (for instance instead of a sprag clutch), and may function generally as described in U.S. Pat. No. 7,938,242 B2 to Chen ("Chen"), which is incorporated herein by reference. Chen was directed to a rear wheel hub for a conventional bicycle, wherein the rear wheel hub included a one-way pawls-style clutch modified to not drive the pedals backwards and not produce noise when the rear wheel was rotated in the backward direction.

In contrast to the modified rear wheel hub of Chen, the present system is configured to work with a standard rear wheel hub, and provides a specially-designed one-way clutch 1 in the electrically-powered drive system 200 of an electrically powered bicycle 1000. Unlike the modified rear wheel hub of Chen, the present system does drive the pedals backwards when the rear wheel 802 is rotated in the backward direction (assuming a conventional rear hub), but at the same time does not attempt to drive the electrically-powered drive system 200 nor electric motor 300 backwards when the rear wheel 802 is rotated in the backward direction.

The specially-designed one-way clutch 1 shown in present FIGS. 15A through 15D and 16 may comprise a clutch body 10 and may rotationally connect a torque input side 80 (which may be connected with a spindle 245 as described in the '502 application) with a torque output side 40 (which may be connected with an outer spindle or spider 202 through various other components 2 as described in the '502 application) via a plurality of clutch pawls 70 (such as three equally-spaced-apart clutch pawls 70, for example). Clutch pawls 70 may each be pivotably connected with the clutch body 10 and each biased by a spring 75 or other biasing means to pivot towards and engage with corresponding teeth of a ratchet wheel 90 that may be connected with the torque output side 40 via a castle tooth interface 50. Alternatively, the clutch pawls 70 and ratchet wheel 90 may be reversed in their attachments, namely to torque output side 40 and torque input side 80, respectively (not shown). The teeth of ratchet wheel 90 are configured to engage the clutch pawls 70 only in a first rotational direction and not in a second rotational direction opposite the first rotational direction, for instance to allow freewheel riding (e.g., backward or no pedaling while rolling forward) of the bicycle 1000, for instance as described in paragraph [0043] of the '502 application. Accordingly, the combination of the ratchet wheel 90 with the torque output side 40 may rotate freely in a first rotational direction within clutch body 10, for instance with the assistance of bearings 81 but the combination of the ratchet wheel 90 with the torque output side 40 cannot rotate freely in a second rotational direction opposite the first rotational direction within clutch body 10 unless the clutch pawls 70 are retracted away from the teeth of the ratchet wheel 90 by relative rotational movement of the mute ring 20 relative to the clutch body 10, for instance as described below.

In the example embodiment shown in present FIGS. 15A through 15D and 16, the clutch pawls 70 each extend laterally beyond the teeth of the ratchet wheel 90 with which the clutch pawls 70 engage. An additional ring 20, which may be called a mute ring 20, may be provided adjacent to the clutch pawls 70. The mute ring 20 may be able to rotate concentric with the clutch assembly 1 through a predetermined limited rotational angle with respect to the clutch pawls 70. For example, the mute ring 20 may be provided with a plurality of slots 30 (such as three concentric arced slots 30, for example), which are adapted to movably receive therein a corresponding number of protrusions 35 extending laterally from the clutch body 10 into the slots 30 of the mute ring 20, such that the mute ring 20 and clutch body 10 can rotate relative to each other about their common axis as each protrusion 35 moves in an arc from a first end of the mating slot 30 to the second end of the mating slot 30. In this way the slots 30 limit the arcuate movement of the protrusions 35 and thus limit the relative rotation between the mute ring 20 and the clutch body 10. The mute ring 20 may be provided with cam surfaces 60 configured to engage those portions of the clutch pawls 70 that extend laterally beyond the teeth of the ratchet wheel 90, such that relative rotational movement of the mute ring 20 in a first relative rotational direction with respect to the clutch pawls 70 causes the cam surfaces 60 in the mute ring 20 to engage or guide those portions of the clutch pawls 70 that extend laterally beyond the teeth of the ratchet wheel 90 and thereby cause the clutch pawls 70 to pivot against springs 75 and release the clutch pawls 70 from engagement with the teeth of the ratchet wheel 90. Likewise, relative rotational movement of the mute ring 20 in a second relative rotational direction opposite the first relative rotational direction with respect to the clutch pawls 70 causes the cam surfaces 60 in the mute ring 20 to disengage or guide those portions of the clutch pawls 70 that extend laterally beyond the teeth of the ratchet wheel 90 to allow the springs 75 to cause the clutch pawls 70 to pivot toward and engage with the teeth of the ratchet wheel 90.

Relative rotational movement between the mute ring 20 and the clutch pawls 70 may be damped with friction-creating material such as one or more friction pads 110 positioned in slidable contact with the mute ring 20, for instance by one or more friction pads 110 being secured to a gearbox housing (not shown) or other surface surrounding or otherwise proximate the mute ring 20. The one or more friction pads 110 (not shown in FIG. 16) may be configured to tend to hold the mute ring 20 in place with respect to the clutch pawls 70, for example, after the motor 300 has briefly turned in the reverse direction and caused the mute ring 20 to engage the clutch pawls 70 and disengage them from the ratchet wheel 90 (e.g., until the motor 300 again turns in the forward direction).

In use, an algorithm in the controller 400 may decide when assistance from the electric motor 300 is no longer needed, for instance by sensing that no forward rotational torque is being applied to the inner spindle 245 as described in paragraph [0042] of the '502 application, and in conjunction with any other predetermined conditions, such as, for example, the passage of a predetermined amount of time. In response to sensing that electric assist is not required, the controller 400 may automatically spin the electric assist motor 300 backwards slightly and/or momentarily to disengage the specially-designed one-way clutch 1 by causing relative rotational movement between the mute ring 20 in a first relative rotational direction with respect to the clutch pawls 70, and thereby causing the cam surfaces 60 in the mute ring 20 to engage or guide those portions of the clutch pawls 70 that extend laterally beyond the teeth of the ratchet wheel 90, which thereby causes the clutch pawls 70 to pivot against springs 75 and release the clutch pawls 70 from engagement with the teeth of the ratchet wheel 90. When this is accomplished the mute ring 20 blocks the clutch pawls 70 from connecting to the ratchet wheel 90. This allows a bicycle 1000 with a conventional rear wheel hub to roll in reverse or backward without the rear wheel 802 attempting to drive the electrically-powered drive system 200 or motor 300 in reverse. At the same time, the cranks 850R and 850L and the pedals normally attached thereto (not shown) will move in reverse just like a normal bicycle that is rolled in reverse or backward, since the electrically-powered drive system 200 works in parallel with the rider-powered drive system (850R, 850L, 860, 870), which otherwise functions like a normal bicycle as described in the '502 application.

When assistance from the electric motor 300 is needed again, an algorithm may decide when and under what conditions the motor 300 should spin in the forward direction, for instance by sensing that sufficient forward rotational torque is being applied to the inner spindle 245 as described in paragraph [0042] of the '502 application, and in conjunction with any other predetermined conditions, such as, for example, the passage of a predetermined amount of time. In response to sensing that electric assist is required, the controller 400 may automatically spin the electric assist motor 300 in the forward direction to provide power, which also engages the specially-designed one-way clutch 1 by causing relative rotational movement of the mute ring 20 in a second relative rotational direction opposite the first relative rotational direction with respect to the clutch pawls 70, which causes the cam surfaces 60 in the mute ring 20 to disengage or guide those portions of the clutch pawls 70 that extend laterally beyond the teeth of the ratchet wheel 90 to allow the springs 75 to cause the clutch pawls 70 to pivot toward and engage with the teeth of the ratchet wheel 90. Once the specially-designed one-way clutch 1 is engaged the motor 300 can assist the rider again, with all the features of a one-way clutch as described in the '502 application (allowing freewheeling by the rider, etc.).

Any of the suitable technologies set forth and incorporated herein may be used to implement various example aspects of the invention as would be apparent to one of skill in the art. For example and not by way of limitation, a pawl and mute ring (damper) system like that shown in Chen may alternatively be used for the pawl clutch, for example.

Although exemplary embodiments and applications of the invention are described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A selectably disconnectable one-way clutch system for a drive system of a bicycle having a front sprocket configured to receive combined rotational power, in a first rotational direction about an axis, and in parallel from both a rider pedaling the bicycle and from an electric motor with a drive system, the system comprising:
   a first member rotatable about the axis and configured to receive a first rotational power in the first rotational direction from either the electric motor and the drive system, or the rider pedaling the bicycle, or both;
   a second member rotatable about the axis and configured to transmit the first rotational power in the first rotational direction to at least one component connected with the front sprocket;
   a selectably disconnectable one-way clutch configured to rotationally connect and disconnect the first and second members, comprising:
      a plurality of pawls pivotably mounted to the first member and biased to engage, in the first rotational direction but not in a second rotational direction that is opposite the first rotational direction, teeth of a ratchet wheel connected to the second member, the pawls each including an extension portion that extends laterally beyond the teeth;
      a ring member adjacent to the pawls that is frictionally rotatable about the axis through a predetermined limited rotational angle relative to the first member, the ring member comprising cam surfaces configured to engage the extension portions of the pawls such that:
         rotational movement of the ring member in the first rotational direction relative to the pawls allows the pawls to pivot toward and engage the teeth of the ratchet and to thereby rotationally connect the first and second members; and
         rotational movement of the ring member in the second rotational direction relative to the pawls causes the pawls to pivot away from the teeth of the ratchet and to thereby rotationally disconnect the first and second members;
   the selectably disconnectable one-way clutch is configured to urge relative rotational movement of the ring member in the first rotational direction relative to the pawls when the electric motor and the drive system apply rotational power in the first rotational direction; and
   the selectably disconnectable one-way clutch is configured to urge relative rotational movement of the ring member in the second rotational direction relative to the pawls when the electric motor and the drive system apply rotational power in the second rotational direction.

2. A bicycle capable of being propelled at least in part by a rider pedaling the bicycle, the bicycle comprising:
   a frame;
   an electric motor with a drive system and motor controller;
   the drive system comprising a front sprocket configured to receive combined rotational power, in a first rotational direction about an axis, and in parallel from both the rider pedaling the bicycle and from the electric motor with the drive system;
   the selectably disconnectable one-way clutch system of claim 1;
   a sensor configured to sense whether or not the rider is pedaling the bicycle and applying rotational power in the first rotational direction, and further configured to send a corresponding signal to the motor controller;

the motor controller configured to cause the electric motor and the drive system to apply rotational power in the first rotational direction when the signal indicates at least that the rider is pedaling the bicycle and applying rotational power in the first rotational direction;

the motor controller configured to cause the electric motor and the drive system to apply rotational power in the second rotational direction when the signal indicates at least that the rider is not pedaling the bicycle and not applying rotational power in the first rotational direction.

3. The bicycle of claim 2, further comprising:

a rear wheel rotationally connected to the frame, the rear wheel comprising a rear hub and a rear sprocket connected to the rear hub with a first one-way locking mechanism that allows the rear sprocket to rotate in the second direction when the rear wheel rotates in the first direction and forces the rear sprocket to rotate in the second direction when rear wheel rotates in the second direction;

a power transmission member connecting the front sprocket and the rear sprocket so that they rotate together proportionally in the same rotational direction;

left and right crank arms connected at first ends thereof with a shaft rotatable about the axis and connected with the front sprocket by a second one-way locking mechanism that allows the shaft to rotate in the second direction when the front sprocket rotates in the first direction and forces the shaft to rotate in the second direction when the front sprocket rotates in the second direction;

left and right pedals connected with the left and right crank arms at second ends thereof; and the selectably disconnectable one-way clutch system is configured so that the rear wheel and rear sprocket are able to rotate in the second direction and cause the front sprocket, left and right crank arms, and left and right pedals, to proportionally rotate in the second direction about the axis, without causing rotation of the electric motor, when the signal indicates at least that the rider is not pedaling the bicycle nor applying rotational power in the first rotational direction.

4. A selectably disconnectable one-way clutch system for a drive system of a bicycle having a front sprocket configured to receive combined rotational power, in a first rotational direction about an axis, and in parallel from both a rider pedaling the bicycle and from an electric motor with a drive system, the system comprising:

a first member rotatable about the axis and configured to receive a first rotational power in the first rotational direction from either the electric motor and the drive system, or the rider pedaling the bicycle, or both;

a second member rotatable about the axis and configured to transmit the first rotational power in the first rotational direction to at least one component connected with the front sprocket;

a selectably disconnectable one-way clutch configured to rotationally connect and disconnect the first and second members, comprising:

a plurality of pawls pivotably mounted to the second member and biased to engage, in the first rotational direction but not in a second rotational direction that is opposite the first rotational direction, teeth of a ratchet wheel connected to the first member, the pawls each including an extension portion that extends laterally beyond the teeth;

a ring member adjacent to the pawls that is frictionally rotatable about the axis through a predetermined limited rotational angle relative to the first member, the ring member comprising cam surfaces configured to engage the extension portions of the pawls such that:

rotational movement of the ring member in the first rotational direction relative to the pawls allows the pawls to pivot toward and engage the teeth of the ratchet and to thereby rotationally connect the first and second members; and rotational movement of the ring member in the second rotational direction relative to the pawls causes the pawls to pivot away from the teeth of the ratchet and to thereby rotationally disconnect the first and second members;

the selectably disconnectable one-way clutch is configured to urge relative rotational movement of the ring member in the first rotational direction relative to the pawls when the electric motor and the drive system apply rotational power in the first rotational direction; and the selectably disconnectable one-way clutch is configured to urge relative rotational movement of the ring member in the second rotational direction relative to the pawls when the electric motor and the drive system apply rotational power in the second rotational direction.

5. A bicycle capable of being propelled at least in part by a rider pedaling the bicycle, the bicycle comprising:

a frame;

an electric motor with a drive system and motor controller;

the drive system comprising a front sprocket configured to receive combined rotational power, in a first rotational direction about an axis, and in parallel from both the rider pedaling the bicycle and from the electric motor with the drive system;

the selectably disconnectable one-way clutch system of claim 4;

a sensor configured to sense whether or not the rider is pedaling the bicycle and applying rotational power in the first rotational direction, and further configured to send a corresponding signal to the motor controller;

the motor controller configured to cause the electric motor and the drive system to apply rotational power in the first rotational direction when the signal indicates at least that the rider is pedaling the bicycle and applying rotational power in the first rotational direction;

the motor controller configured to cause the electric motor and the drive system to apply rotational power in the second rotational direction when the signal indicates at least that the rider is not pedaling the bicycle and not applying rotational power in the first rotational direction.

6. The bicycle of claim 5, further comprising:

a rear wheel rotationally connected to the frame, the rear wheel comprising a rear hub and a rear sprocket connected to the rear hub with a first one-way locking mechanism that allows the rear sprocket to rotate in the second direction when the rear wheel rotates in the first direction and forces the rear sprocket to rotate in second direction when rear wheel rotates in the second direction;

a power transmission member connecting the front sprocket and the rear sprocket so that they rotate together proportionally in the same rotational direction;

left and right crank arms connected at first ends thereof with a shaft rotatable about the axis and connected with the front sprocket by a second one-way locking mechanism that allows the shaft to rotate in the second direction when the front sprocket rotates in the first direction and forces the shaft to rotate in the second direction when the front sprocket rotates in the second direction;

left and right pedals connected with the left and right crank arms at second ends thereof; and the selectably disconnectable one-way clutch system is configured so that the rear wheel and rear sprocket are able to rotate in the second direction and cause the front sprocket, left and right crank arms, and left and right pedals, to proportionally rotate in the second direction about the axis, without causing rotation of the electric motor, when the signal indicates at least that the rider is not pedaling the bicycle nor applying rotational power in the first rotational direction.

* * * * *